United States Patent
Kimura

(10) Patent No.: US 7,149,016 B2
(45) Date of Patent: Dec. 12, 2006

(54) OPTICAL ELEMENT AND SCANNING OPTICAL SYSTEM HAVING THE SAME AND IMAGE FORMING APPARATUS

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/496,826

(22) PCT Filed: Dec. 3, 2002

(86) PCT No.: PCT/JP02/12646

§ 371 (c)(1),
(2), (4) Date: May 27, 2004

(87) PCT Pub. No.: WO03/052467

PCT Pub. Date: Jun. 26, 2003

(65) Prior Publication Data

US 2004/0263979 A1 Dec. 30, 2004

(30) Foreign Application Priority Data

Dec. 17, 2001 (JP) ............................ 2001-382796

(51) Int. Cl.
*G02B 26/08* (2006.01)
(52) U.S. Cl. ..................... 359/196; 359/205; 359/206; 359/215; 359/223; 359/566; 359/569; 359/573; 359/575; 347/244; 347/258
(58) Field of Classification Search ........ 359/196–226, 359/563, 566, 569–570, 572–573, 575; 347/224–261
See application file for complete search history.

(56) References Cited

U.S. PATENT DOCUMENTS

| | | | |
|---|---|---|---|
| 5,355,244 A | 10/1994 | Suzuki et al. | |
| 5,422,753 A * | 6/1995 | Harris | 359/216 |
| 5,459,601 A * | 10/1995 | Suzuki et al. | 359/205 |
| 5,486,694 A * | 1/1996 | Harris | 250/236 |
| 5,561,558 A * | 10/1996 | Shiono et al. | 359/569 |
| 5,694,247 A * | 12/1997 | Ophey et al. | 359/566 |
| 5,940,663 A | 8/1999 | Mizunuma et al. | 399/201 |
| 6,021,260 A * | 2/2000 | Katahira | 358/1.16 |
| 6,268,877 B1 | 7/2001 | Sato et al. | 347/241 |

FOREIGN PATENT DOCUMENTS

| | | |
|---|---|---|
| EP | 1 260 847 | 11/2002 |
| JP | 58-174906 | 10/1983 |
| JP | 5-303049 | 11/1993 |

(Continued)

OTHER PUBLICATIONS

Grann, E.B. et al., "Artificial Uniaxial And Biaxial Dielectrics With Use Of Two-Dimensional Subwavelength Binary Gratings", Journal of the Optical Society of America, vol. 11, No. 10, pp. 2695-5703 (Oct. 1994).

(Continued)

*Primary Examiner*—Mark A. Robinson
*Assistant Examiner*—Pranav Khatri
(74) *Attorney, Agent, or Firm*—Fitzpatrick, Cella, Harper & Scinto

(57) ABSTRACT

An optical element that can reduce Fresnel (surface) reflection on a lens surface to be a cause of flare or ghost, and a scanning optical system having the same are provided. A microstructure grating is provided on at least one optical surface of the optical element, and the microstructure grating consists of a structure having an antireflection action corresponding to an incidence angle of light beams.

7 Claims, 10 Drawing Sheets

FOREIGN PATENT DOCUMENTS

| | | |
|---|---|---|
| JP | 9-500459 | 1/1997 |
| JP | 10-160906 | 6/1998 |
| JP | 2000-137109 | 5/2000 |
| JP | 2000-206445 | 7/2000 |
| JP | 2001-66531 | 3/2001 |
| WO | WO 95/30163 | 11/1995 |
| WO | WO 01/71410 | 9/2001 |
| WO | WO 01/74560 | 10/2001 |

OTHER PUBLICATIONS

Jan. 17, 2006, Office Action issued in European Application No. 02790703.9.

Dec. 16, 2005, Office Action issued in Chinese Application No. 02824624.X.

\* cited by examiner

OPTICAL ELEMENT AND SCANNING OPTICAL SYSTEM HAVING THE SAME AND IMAGE FORMING APPARATUS

BACKGROUND OF THE INVENTION

1. Field of the Invention

The present invention relates to an optical element having an antireflection action corresponding to an incidence angle of light beams and a scanning optical system having the optical element. In addition, the present invention is preferable for image forming apparatuses such as a laser beam printer, a digital copying machine and a multi-function printer that have an electrophotographic process, which deflects light beams emitted from light source means by a light deflector (deflection means) and optically scans a surface to be scanned via scanning optical means including an optical element that has an fθ characteristic and is provided with a microstructure grating to thereby record image information.

2. Description of the Related Art

In a conventional scanning optical system such as a laser beam printer (LBP), light beams emitted from light source means, which are optically modulated according to an image signal, are periodically deflected by a light deflector consisting of, for example, a polygon mirror and are focused in a spot shape on a surface of a photosensitive recording medium to optically scan the surface of the recording medium by scanning optical means having an fθ characteristic and thereby perform image recording.

FIG. 11 is a main part sectional view in a main scanning direction of the conventional scanning optical system (main scanning sectional view).

In the figure, reference numeral 91 denotes light source means, which consists of, for example, a semiconductor laser. Reference numeral 92 denotes a collimator lens, which converts divergent light beams emitted from the light source means 91 into substantially parallel light beams. Reference numeral 93 denotes an aperture stop, which limits light beams that pass therethrough to shape their beam shapes. Reference numeral 94 denotes a cylindrical lens, which has a predetermined power only in a sub-scanning direction and focuses light beams that have passed the aperture stop 93 on a deflection surface (reflection surface) 95a of a light deflector 95 discussed below substantially as a linear image within a sub-scanning section.

Reference numeral 95 denotes a light deflector as deflection means, which consists of, for example, a polygon mirror (rotatable polygon mirror) of four-side structure and rotates at a constant speed in a direction of arrow A in the figure by driving means (not shown) such as a motor.

Reference numeral 96 denotes a scanning lens system functioning as scanning optical means having a condensing function and an fθ characteristic. The scanning lens system 96 consists of two scanning lenses of first and second scanning lenses 96a and 96b, focuses light beams based on image information reflected and deflected by the light deflector 95 on a photosensitive drum surface 97 functioning as a surface to be scanned, and establishes a conjugate relationship between the deflection surface 95a of the light deflector 95 and the photosensitive drum surface 97 within the sub-scanning section, thereby acquiring a toppling correction function.

In the figure, divergent light beams emitted from the semiconductor laser 91 are converted into substantially parallel light beams by the collimator lens 92, and light beams that pass through the aperture stop 93 are limited to have their beam shapes shaped by the aperture stop 93. Then, the substantially parallel light beams are entered into the cylindrical lens 94. The substantially parallel light beams on the main scanning section among those entered into the cylindrical lens 94 exit as they are. In addition, the substantially parallel light beams on the sub-scanning section converge and are focused substantially as a linear image (linear image which is longitudinal in the main scanning direction) on the deflection surface 95a of the light deflector 95. Then, light beams reflected and deflected on the deflection surface 95a of the light deflector 95 are focused in a spot shape on the photosensitive drum surface 97 via the first and second scanning lenses 96a and 96b and optically scan the photosensitive drum surface 97 at a uniform speed in a direction of arrow B (main scanning direction) by rotating the light deflector 95 in the direction of arrow A. Consequently, image recording is performed on the photosensitive drum surface 97 functioning as a recording medium.

However, the above-mentioned conventional scanning optical system has problems described below.

In recent years, it has become common to produce scanning optical means of a scanning optical system (scanning lens system) from plastics with which an aspherical surface shape is easily constituted and manufactured. However, in a plastic lens, it is difficult to apply antireflection coating on a surface of the lens due to technical reasons and reasons relating to costs. Thus, Fresnel reflection occurs on each lens surface.

FIG. 12 is an explanatory diagram showing angle dependency of P-polarized light reflectance and S-polarized light reflectance at the time when light beams are entered into, for example, a resin optical member with a refractive index of n=1.524. As shown in the diagram, Fresnel reflection on each optical surface (lens surface) ranges from several % to as large as 10% or more depending on an incidence angle.

Therefore, Fresnel reflection light generated on a lens surface without the antireflection coating is reflected on other lens surfaces and finally reaches a surface to be scanned to turn into ghost.

For example, as a first case, with respect to axial light beams, Fresnel reflection light is multi-reflected between any two surfaces among incidence surfaces and exit surfaces of the respective first and second scanning lenses 96a and 96b and reaches the surface to be scanned 97.

As a second case, when a lens surface 96a1 relatively close to the light deflector 95 of the first and second scanning lenses 96a and 96b has a recessed surface shape and incident light beams are nearly vertical as shown in FIG. 11, Fresnel reflection light on this lens surface 96a1 returns to the light deflector 95 and is reflected on the deflection surface (reflection surface) 95a of the light deflector 95 to pass through the scanning optical means 96. Thereafter, Fresnel reflection light reaches the surface to be scanned 97 to turn into ghost. When a quantity of ghost light exceeds approximately 1% of regular light beams, deterioration of an image becomes conspicuous, depending on an image forming system of a laser beam printer (LBP).

In addition, as a third case, surface reflection light reflected on the surface 97 of a photosensitive drum (photosensitive body) arranged in a position on the surface to be scanned may be reflected on any of incidence surfaces or exit surfaces of the respective first and second scanning lenses 96a and 96b and return to the photosensitive drum again to turn into flare light. A surface having a particularly large influence is an exit surface 96b2 of the second scanning lens 96b close to the surface to be scanned 97.

Up to now, in view of these cases, power distribution is adjusted to design a scanning optical system such that ghost light is not condensed on a surface to be scanned in order to reduce an influence of the ghost light. As a result, a degree of freedom of design is limited.

As another method, a method of optimizing an amount of transmitted light is proposed in, for example, Japanese Patent Application Laid-Open Nos. 2000-206445 and 2001-66531.

In Japanese Patent Application Laid-Open No. 2000-206445, it is attempted to solve the problem by appropriately setting diffraction efficiency of a diffraction grating surface provided in a scanning optical means. That is, desired power distribution is set for the purpose of correcting magnification chromatic aberration or focus to cut a grating with a desired pitch, and a height (depth) of a grating on the diffraction grating surface is appropriately set, whereby diffraction efficiency of diffraction light (primary diffraction light) to be used is changed from on-axis to off-axis and this change offsets a change in transmissivity generated on other deflection surfaces.

However, with this method, diffraction light of another order (also referred to as unnecessary diffraction light) increases when diffraction efficiency of diffraction light to be used is reduced. The increased diffraction light of another order reaches the surface to be scanned unless it is blocked by appropriately providing light shielding walls or the like, and turns into flare light, resulting in a factor of deterioration of an image.

Japanese Patent Application Laid-Open No. 2001-66531 discloses a condition for not allowing surface reflection light reflected on a surface of a photosensitive drum arranged in a position on a surface to be scanned to return to a scanning lens by working out a position of a return mirror and an incidence angle to a photosensitive drum. However, this also becomes a restriction for an arrangement of parts (optical elements) in terms of designing.

SUMMARY OF THE INVENTION

It is an object of the present invention to provide an optical element that can reduce Fresnel (surface) reflection on a lens surface to be a cause of flare or ghost, and a scanning optical system having the same.

In addition, it is an object of the present invention to provide an optical element that can reduce Fresnel reflection on a lens surface without increasing additional steps such as coating, and a scanning optical system having the same.

In order to attain the above-mentioned object, according to a first aspect of the present invention, there is provided an optical element provided with a microstructure grating on at least one optical surface, characterized in that the microstructure grating comprises a structure having an antireflection action corresponding to an incidence angle of light beams.

According to a second aspect of the present invention, in an optical element according to the first aspect, the optical element is characterized in that the microstructure grating is a 0-th order grating.

According to a third aspect of the present invention, in an optical element according to the first aspect, the optical element is characterized in that the optical surface is a lens surface, a deflection surface or a mirror surface and a shape of the optical surface is a plane or a curved surface.

According to a fourth aspect of the present invention, in an optical element according to the first aspect, the optical element is characterized in that the microstructure grating is formed integrally with a substrate forming the optical surface.

According to a fifth aspect of the present invention, in an optical element according to the first aspect, the optical element is characterized in that the structure having an antireflection action corresponding to an incidence angle of light beams is based on a change of at least one of a grating pitch, a grating depth and a grating constant of the microstructure grating.

According to a sixth aspect of the present invention, in an optical element according to the first aspect, the optical element is characterized in that a material of the microstructure grating consists of a transparent resin material or a glass material.

According to a seventh aspect of the present invention, in an optical element according to the first aspect, the optical element is characterized in that, when a maximum value of a reflectance in each incidence angle of the optical surface on which the microstructure grating is provided is assumed to be Rmax, the following condition is satisfied:

$$Rmax \leq 1(\%)$$

According to an eighth aspect of the present invention, in an optical element according to the first aspect, the optical element is characterized in that a grating pitch of the microstructure grating is smaller than a grating pitch Pmax that is determined based on a maximum incidence angle θmax at the time when light beams are entered into the microstructure grating.

According to a ninth aspect of the present invention, there is provided an optical system, characterized by including the optical element according to the first aspect.

According to a tenth aspect of the present invention, there is provided a scanning optical system including:

deflection means for deflecting light beams emitted from light source means; and scanning optical means for guiding the light beams deflected by the deflection means onto a surface to be scanned, in which the scanning optical means has an optical element provided with a microstructure grating on one or more optical surfaces and the microstructure grating comprises a structure having an antireflection action corresponding to an incidence angle of light beams entered into the optical element.

According to an eleventh aspect of the present invention, in a scanning optical system according to the tenth aspect, the scanning optical system is characterized in that the scanning optical means has at least one refractive optical element and a microstructure grating having an antireflection action corresponding to an incidence angle of light beams on a whole scanning area is provided on at least one refractive surface of the refractive optical element.

According to a twelfth aspect of the present invention, in a scanning optical system according to the tenth aspect, the scanning optical system is characterized in that, in order to restrain multiple surface reflection beams generated between two optical surfaces in the scanning optical means from reaching the surface to be scanned, the microstructure grating is provided on any one or both of the two optical surfaces.

According to a thirteenth aspect of the present invention, in a scanning optical system according to the tenth aspect, the scanning optical system is characterized in that the microstructure grating is provided on an optical surface on which an incidence angle on the optical surfaces of the scanning optical means becomes maximum.

According to a fourteenth aspect of the present invention, in a scanning optical system according to the tenth aspect, the scanning optical system is characterized in that the microstructure grating is provided on a surface closest to the deflection means among the optical surfaces of the scanning optical means.

According to a fifteenth aspect of the present invention, in a scanning optical system according to the tenth aspect, the scanning optical system is characterized in that the surface of the microstructure grating is provided on a surface closest to the surface to be scanned among the optical surfaces of the scanning optical means.

According to a sixteenth aspect of the present invention, in a scanning optical system according to the tenth aspect, the scanning optical system is characterized in that, when a maximum value of a reflectance in each angle of view of the optical surface on which the microstructure grating is provided is assumed to be Rmax, the following condition is satisfied:

Rmax≦1(%).

According to a seventeenth aspect of the present invention, in a scanning optical system according to the tenth aspect, the scanning optical system is characterized in that the antireflection action corresponding to an incidence angle of light beams entered into the optical element is based on a change of at least one of a grating pitch, a grating depth, and a grating constant according to an incidence angle in a position where light beams reaching a predetermined image height pass through the surface of the microstructure grating.

According to an eighteenth aspect of the present invention, in a scanning optical system according to the tenth aspect, the scanning optical system is characterized in that the optical element constituting the scanning optical means consists of a transparent resin material and a microstructure grating having an antireflection action is provided on one or more optical surfaces of the optical element.

According to a nineteenth aspect of the present invention, in a scanning optical system according to the tenth aspect, the scanning optical system is characterized in that the optical surface on which the microstructure grating is provided is a surface on which a change in an incidence angle of light beams entered into the optical element is largest among the optical surfaces of the optical element of the scanning optical means.

According to a twentieth aspect of the present invention, in a scanning optical system according to the tenth aspect, the scanning optical system is characterized in that the microstructure grating is provided on all of the optical surfaces of the scanning means According to a twenty-first aspect of the present invention, in a scanning optical system according to the tenth aspect, the scanning optical system is characterized in that the microstructure grating is a 0-th order grating.

According to a twenty-second aspect of the present invention, in a scanning optical system according to the tenth aspect, the scanning optical system is characterized in that the antireflection action corresponding to an incidence angle of light beams entered into the optical element is attributable to a difference of any one or more of grating pitches, grating depths, and grating constants of a center of scanning and a periphery of scanning of the microstructure grating according to an incidence angle in a position where light beams reaching a predetermined image height passes through the surface of said microstructure grating.

According to an twenty-third aspect of the present invention, in a scanning optical system according to the tenth aspect, the optical element is characterized in that a grating pitch of the microstructure grating is smaller than a grating pitch Pmax that is determined based on a maximum incidence angle θmax at the time when light beams are entered into the microstructure grating.

According to a twenty-fourth aspect of the present invention, in a scanning optical system according to the tenth aspect, the scanning optical system is characterized in that the microstructure grating is formed on an optical surface of a spherical surface, an aspherical surface, a rotationally asymmetrical curved surface, or a rotationally asymmetrical diffractive surface.

According to a twenty-fifth aspect of the present invention, in a scanning optical system according to the tenth aspect, the scanning optical system is characterized in that the microstructure grating is formed on an optical surface of a plane shape.

According to a twenty-sixth aspect of the present invention, there is provided an image forming apparatus, characterized by including the scanning optical system according to the tenth aspect; a photosensitive body arranged on the surface to be scanned; a developing device for developing an electrostatic latent image formed on the photosensitive body as a toner image by light beams scanned by the scanning optical system; a transfer device for transferring the developed toner image on a material to have an image transferred thereon; and a fixing device for fixing the transferred toner image on the material to have an image transferred thereon.

According to a twenty-seventh aspect of the present invention, there is provided an image forming apparatus, characterized by including the scanning optical system according to the tenth aspect; and a printer controller for converting code data inputted from an external device to an image signal and inputting the image signal in the scanning optical system.

DESCRIPTION OF THE PREFERRED EMBODIMENTS

Embodiment 1

An optical element of the present invention is an optical element in which a microstructure grating is provided on at least one optical surface, in which the microstructure grating consists of a structure having an antireflection action corresponding to an incidence angle of light beams.

The optical element of the present invention is applicable to various optical systems such as a photographing system, a projection system, and an image forming system in which an incidence angle changes from a central part to a peripheral part of the element.

Figure 1:
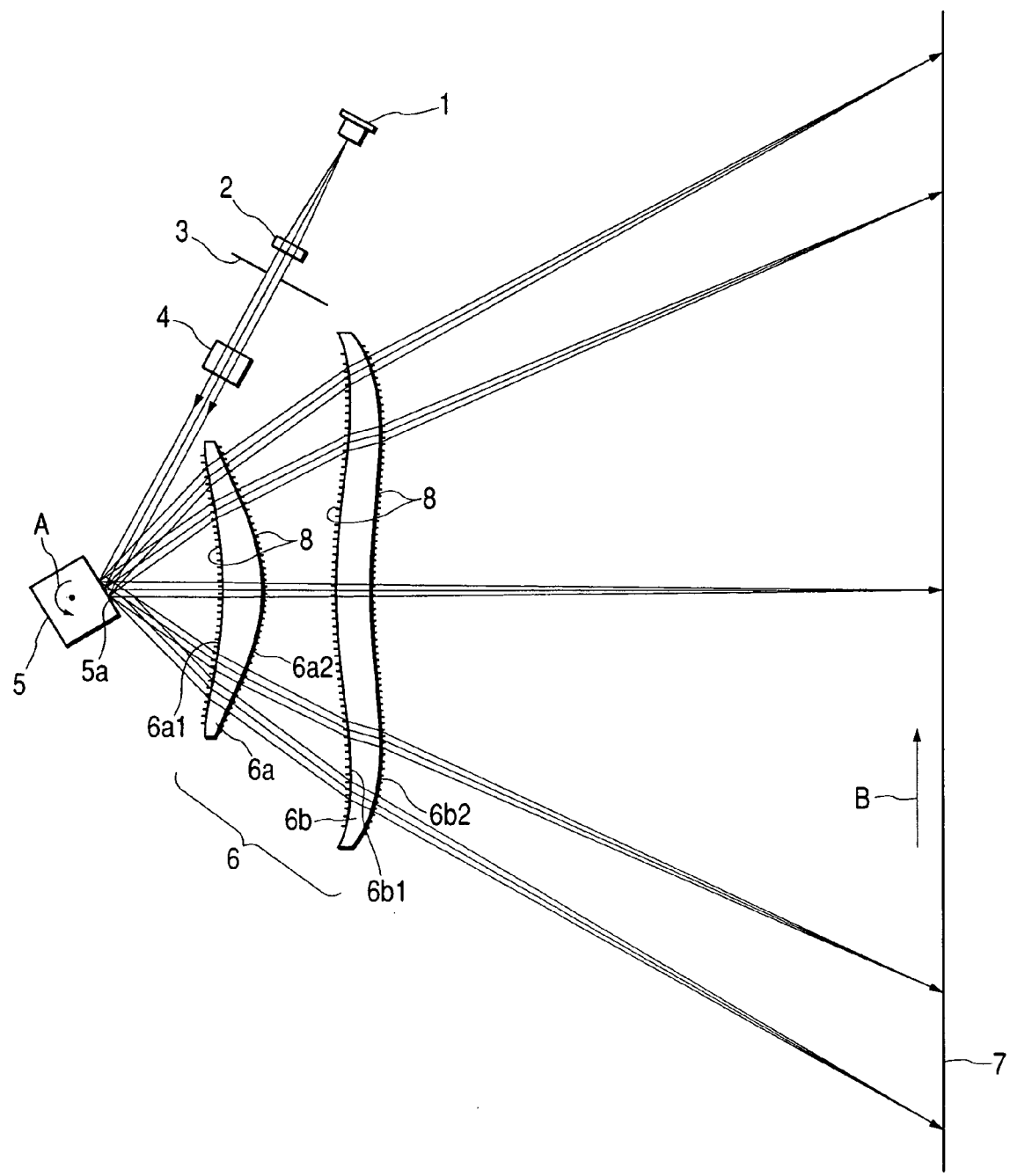
FIG. 1 is a main scanning sectional view of Embodiment 1 of the present invention.

Next, Embodiment 1 in which the optical element of the present invention is applied to a scanning optical system will be described with reference to FIGS. 1 to 4. FIG. 1 is a main part sectional view in a main scanning direction of Embodiment 1 of the scanning optical system of the present invention (main scanning sectional view).

Note that, in this specification, a direction in which light beams are reflected and deflected (deflected and scanned) by deflection means is defined as a main scanning direction and a direction perpendicular to an optical axis of scanning optical means and the main scanning direction is defined as a sub-scanning direction.

In the figure, reference numeral 1 denotes light source means, which consists of, for example, a semiconductor laser. Reference numeral 2 denotes a condensing lens (collimator lens), which converts divergent light beams emitted from the light source means 1 into substantially parallel light beams or convergent light beams.

Reference numeral 3 denotes an aperture stop, which limits light beams that pass therethrough to shape their beam shapes. Reference numeral 4 denotes a cylindrical lens, which has a predetermined power only in a sub-scanning direction and focuses light beams that have passed through the aperture stop 3 substantially as a linear image on a deflection surface (reflection surface) of a light deflector 5 discussed below within a sub-scanning section.

Reference numeral 5 denotes a light deflector as deflection means, which consists of, for example, a polygon mirror (rotational polygon mirror) of four-side structure and rotates at a constant speed in a direction of arrow A in the figure by driving means (not shown) such as a motor.

Reference numeral 6 denotes a scanning lens system functioning as scanning optical means having a condensing function and an fθ characteristic. The scanning lens system 6 consists of two scanning lenses of first and second scanning lenses (focusing elements) 6a and 6b made of a plastic material (transparent resin material), focuses light beams based on image information reflected and deflected by the light deflector 5 on a surface to be scanned 7, and establishes a conjugate relationship between the deflection surface 5a of the light deflector 5 and the surface to be scanned 7 within the sub-scanning section, thereby acquiring a toppling correction function.

Note that light beams from the light source means 1 may be directly entered into the light deflector 5 without using the above-mentioned optical elements 2, 3, and 4.

Each lens surface of the two scanning lenses of the first and second scanning lenses 6a and 6b in this embodiment consists of a curved surface shape of a spherical surface or an aspherical surface within the main scanning section shown in FIG. 1. Within the sub-scanning section perpendicular to the main scanning section, a known special non-spherical surface shape in which a curvature changes from on-axis (center of scanning) toward off-axis (periphery of scanning) is adopted as a base shape.

In this embodiment, a microstructure grating 8 consisting of a transparent resin material or a glass material is formed over the entire surface of an incidence surface (surface closest to the light deflector 5) 6a1 and an exit surface 6a2 of the first scanning lens 6a and an incidence surface 6b1 and an exit surface (surface closest to the surface to be scanned 7) 6b2 of the second scanning lens 6b.

This microstructure grating 8 consists of a structure having an antireflection action corresponding to an incidence angle of light beams entered into a scanning lens, and reduces incidence of reflected light from a lens surface of the scanning optical means 6 on the surface to be scanned 7.

In this embodiment, divergent light beams emitted from the semiconductor laser 1 are converted into substantially parallel light beams by the collimator lens 2, and light beams that pass through the aperture stop 3 are limited to have their beam shapes shaped by the aperture stop 3 and are entered into the cylindrical lens 4. The substantially parallel light beams on the main scanning section among those entered into the cylindrical lens 4 exit as they are. In addition, the substantially parallel light beams within the sub-scanning section converge and are focused substantially as a linear image (linear image which is longitudinal in the main scanning direction) on the deflection surface 5a of the light deflector 5. Then, light beams reflected and deflected on the deflection surface 5a of the light deflector 5 are focused in a spot shape on the surface to be scanned 7 via the first and second scanning lenses 6a and 6b and optically scan the surface to be scanned 7 at a uniform speed in a direction of arrow B (main scanning direction) by rotating the light deflector 5 in the direction of arrow A. Consequently, image recording is performed on the surface to be scanned 7 functioning as a recording medium.

In this case, in order to adjust timing of a starting position of scanning on a photosensitive drum surface functioning as the surface to be scanned 7 before optically scanning the photosensitive drum surface, a part of light beams reflected and deflected on the deflection surface 5a of the light deflector (polygon mirror) 5 (BD light beams) are condensed on a BD slit (not shown) by a BD lens (not shown) provided separately from the scanning lenses 6a and 6b, and then, guided to a BD sensor (not shown). Then, a writing position detection signal (BD signal) obtained by detecting an output signal from the BD sensor (not shown) is used to adjust timing of a starting position of scanning for image recording on the photosensitive drum surface 7.

In this embodiment, the semiconductor laser 1 functioning as a light source is arranged such that light beams are entered into the scanning optical means 6 substantially as P-polarized light. That is, the semiconductor laser 1 is arranged such that a horizontal transverse mode direction becomes substantially parallel with the surface to be scanned 7.

Figure 2:
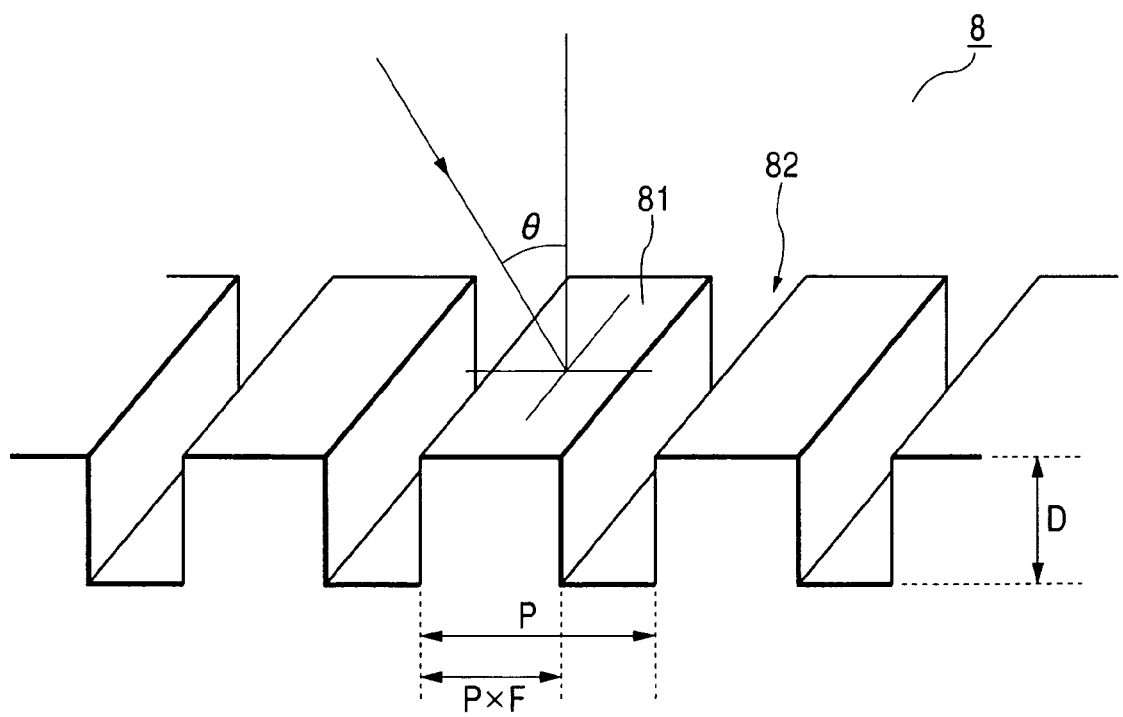
FIG. 2 is a view showing a microstructure grating of Embodiment 1 of the present invention.

In this embodiment, as described above, the special non-spherical surface shape is adopted as a base shape over the entire surface of the incidence surface $6a1$ and the exit surface $6a2$ of the first scanning lens $6a$ of the scanning optical means 6 and the incidence surface $6b1$ and the exit surface $6b2$ of the second lens $6b$ of the scanning optical means 6, and the microstructure grating 8 shown in FIG. 2 is formed on the surfaces thereof.

In this embodiment, the microstructure grating 8, which is a 0-th order grating, is formed in a whole scanning area (within a scanning angle of view) on optical surfaces of the scanning lenses $6a$ and $6b$ constituting the scanning optical means 6.

In addition, a microstructure grating for restraining Fresnel (surface) reflection may be provided on an incidence surface of the BD lens (not shown) through which BD light beams pass.

Consequently, in this embodiment, a reflectance (and a transmissivity) can be controlled arbitrarily, and Fresnel (surface) reflection that occurs between the incidence surface $6a1$ and the exit surface $6a2$ of the first scanning lens $6a$ of the scanning optical means 6 and between the incidence surface $6b1$ and the exit surface $6b2$ of the second lens $6b$ of the scanning optical means 6 is appropriately adjusted, multiple surface reflection light beams generated between the two lense surfaces are restrained from reaching the surface to be scanned 7, and flare and ghost light that reach the surface to be scanned 7 are reduced.

In this embodiment, when a maximum value of reflectance at each angle of view of the lens surface on which the microstructure grating 8 is provided is assumed to be Rmax, Rmax is set so as to satisfy the following condition:

$$\text{Rmax} \leq 1(\%) \tag{A}$$

It is not desirable that Rmax deviates from the above Conditional Expression (A) because it becomes difficult to reduce flare and ghost light that reach the surface to be scanned 7.

Further, in this embodiment, the microstructure grating 8 may be provided on one optical surface that has the largest influence on flare and ghost light that reach the surface to be scanned 7 (surface with a largest incidence angle (largest change in an incidence angle), etc.). In addition, one or a plurality of microstructure gratings 8 may be provided. A surface on which the microstructure grating 8 is provided may be a spherical surface, an aspherical surface, or a curved surface that is rotationally asymmetrical, a diffractive surface that is rotationally asymmetrical or a plane that is rotationally asymmetrical.

In addition, although the microstructure grating 8 is provided on both the lens surfaces of the incidence surface $6a1$ and the exit surface $6a2$ of the first scanning lens $6a$ and the incidence surface $6b1$ and the exit surface $6b2$ of the second lens $6b$, respectively as described above in this embodiment, the present invention is not limited to this and the effect of the present invention can be obtained when the microstructure grating 8 is provided only on any one of the lens surfaces.

As shown in FIG. 2, the microstructure grating 8 has a repeating structure in which two portions of a grating portion 81 and a non-grating portion 82 are arranged in one-dimensional direction (main scanning direction). When a length for one period of the grating portion 81 and the non-grating portion 82 is assumed to be a grating pitch P and a grating constant is assumed to be F, a length L in the arrangement direction of the grating portion 81 is represented as L=F×P. In addition, a grating depth is assumed to be D. Note that the microstructure grating 8 may be constituted integrally by a substrate (glass substrate or transparent resin substrate) that forms an optical surface.

As the microstructure grating 8, the grating pitch P that satisfies a condition as a so-called 0-th order grating is selected. The microstructure grating 8 is called an SWS (subwave structure), which has a grating pitch that is one to two digits smaller than that of an ordinary diffractive grating and targets the use of 0-th order light that does not have a diffractive action.

If only 0-th order diffractive light is allowed to exist due to the microstructure grating 8, transmission of light in directions other than that of the 0-th order light is eliminated and reflected light eventually disappears. The principle thereof is disclosed in Japanese Publication No. 03-70201 (Japanese Patent Application Laid-Open No. 58-174906).

The 0-th order grating is a grating that does not generate diffractive light other than 0-th order light in a microstructure grating of a periodic shape (see Optical Society of America Vol. 11, No 10/October 1994/J. Opt. Soc. Am. A p2695).

Usually, in a periodic structure grating, diffractive light is generated at a diffractive angle that satisfies the following conditional expression of diffraction:

$$P(\text{Ns} \cdot \sin \theta m - \text{Ni} \cdot \sin \theta i) = m\lambda \tag{1}$$

where, P is a grating pitch, Ni is a refractive index (of a medium of the structure grating) on an incidence side, $\theta i$ is an incidence angle, $\theta m$ is an m-th order diffractive angle, Ns is a refractive index (of a medium of the structure grating) on an exit side, m is a diffractive order, and $\lambda$ is a wavelength to be used. As is evident from Conditional Expression (1), a diffractive angle $\theta m \geq \theta_1$ (m=1). As a condition for not generating diffractive light of + first order, the Optical Society of America indicates that, since $$\theta_{+1} \geq 90° \tag{2}$$

at the time of vertical incidence, the following expression is a condition of the 0-th order grating:

$$P < \lambda/(\text{Ns} + \text{Ni} \cdot \sin \theta i) \tag{3}$$

Further, at the time of most off-axis, $\theta_{+1}$ is 90 degrees or more, and the grating pitch P becomes a further smaller pitch Pa. At the time when an incidence angle is other than 0 degrees, it is necessary to make the grating pitch P much smaller.

In this embodiment, when a pitch of a grating in a position y from a center where light beams reaching a predetermined image height pass through the microstructure grating 8 on the surface to be scanned 7 is assumed to be Py, a wavelength of light beams from the light source means 1 is assumed to be $\lambda$, an incidence angle of light beams in the position y is assumed to be $\theta i$, a refractive index of a medium on an incidence side of the microstructure grating 8 is assumed to be Ni, and a refractive index of a medium on an exit side of the microstructure grating 8 is assumed to be Ns, the following condition is satisfied:

$$Py < \lambda/(\text{Ns} + \text{Ni} \cdot \sin \theta i) \tag{4}$$

Figure 3:
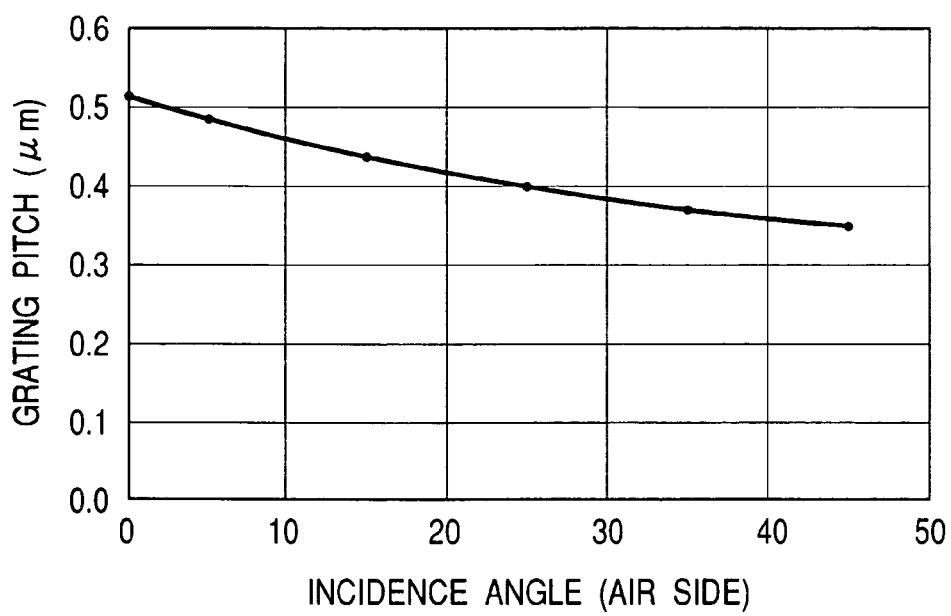
FIG. 3 is an explanatory diagram showing a relationship between a grating pitch and an incidence angle of Embodiment 1 of the present invention.

FIG. 3 is an explanatory diagram showing, in a form of a graph, how the grating pitch P changes with respect to the incidence angle θi when a refractive index n and a wavelength to be used λ of a material of a lens are set to 1.524 and 780 mm, respectively. The graph shows a maximum pitch that satisfies the 0-th order grating. Diffractive light other than the 0-th order light is not generated with a pitch smaller than this. According to this, it is seen that, if the incidence angle θi is zero, that is, the grating pitch P of a microstructure grating is 0.5 μm in the case of the vertical incidence, the microstructure grating behaves as a 0-th order grating. However, if the incidence angle θi is 45°, the condition of a 0-th order grating is not satisfied with the grating pitch P of a microstructure grating of 0.5 μm. It is seen that in the 0-th order grating with respect to the incidence angle θi of 45°, the grating pitch P is required to be smaller than 0.35 μm.

In the scanning optical system as in this embodiment, the incidence angle θi of incident light beams of each lens surface of the scanning optical means 6, that is, each lens surface of the incidence surface 6a1 and the exit surface 6a2 of the first lens 6a and the incidence surface 6b1 and the exit surface 6b2 of the second lens 6b depends on the position y on the lens surface. Thus, a maximum pitch that satisfies the 0-th order grating can be determined in various places on each lens surfaces.

That is, when a grating pitch, which is determined when a maximum incidence angle of light beams entered into the microstructure grating 8 is assumed to be θymax, is assumed to be Pymax, the microstructure grating 8 is preferably constituted with the grating pitch P that satisfies the following condition:

$$P < Pymax \quad (5)$$

Thus, if the maximum incidence angle θymax is set to 45°, since Pymax≈0.35 μm, it is sufficient to select the grating pitch P smaller than this.

Next, the above-mentioned grating constant F will be described. It is known that a grating behaves as structural birefringence if a material that is optically isotropic is regularly arranged as a particle that is sufficiently larger than a molecule and smaller than a wavelength of light. In Optical Principle iii, P1030, Tokai University Press, it is indicated that a so-called rectangular grating, in which a sectional shape in an arrangement direction of a grating is a rectangular shape as shown in FIG. 2, can be modeled as an aggregate with a parallel flat plate with thin grating portion 81 and non-grating portion 82.

According to this, it is seen from the grating constant F and refractive indexes of materials of the grating portion 81 and the non-grating portion 82 that different refractive indexes are shown with respect to two axes in a grating arrangement direction and a direction perpendicular to the grating arrangement. Thus, if an arrangement direction of a grating and a polarization direction of a laser to be used is determined, the grating constant F can be defined.

In this embodiment, a microstructure grating is constituted such that an arrangement direction of a grating coincides with a deflecting direction of light beams, that is, grooves of the grating are perpendicular to the deflecting direction of light beams. Since the polarization direction of light beams is P-polarization (direction horizontal to the paper surface in FIG. 1; deflecting direction of light beams) as described before, in order to avoid an influence of the structural birefringence, it is sufficient to make the arrangement direction of a grating and the polarization direction of light beams to be in a parallel or vertical relationship.

Figure 4:
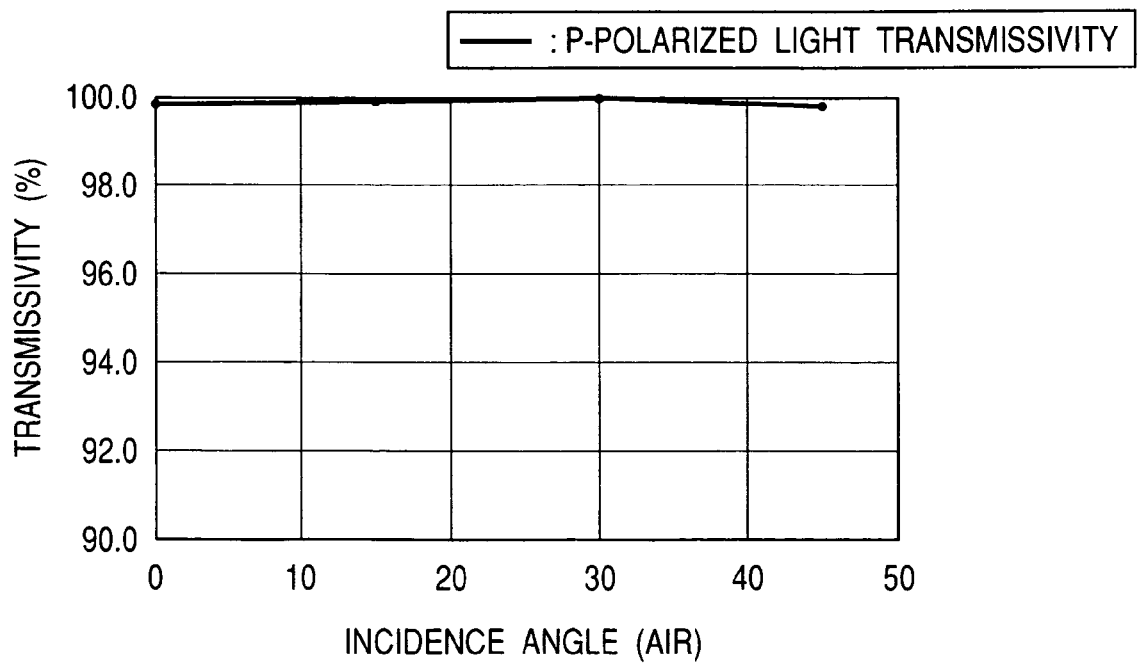
FIG. 4 is an explanatory diagram showing a relationship between a transmissivity and an incidence angle of Embodiment 1 of the present invention.

In this embodiment, a microstructure grating was optimized such that a change in a P-polarized light transmissivity of 0-th order light became small regardless of an incidence angle. As a result, assuming that the wavelength to be used λ=780 nm and the refractive index of a material of a scanning lens n=1.524, the grating pitch P=0.3 μm, the grating constant F=0.65, the grating depth D=0.16 μm were obtained as a shape of the microstructure grating. A transmissivity characteristic (angle of view dependency of transmissivity) of P-polarized light corresponding to an incidence angle in this grating shape is as shown in FIG. 4.

Figure 12:
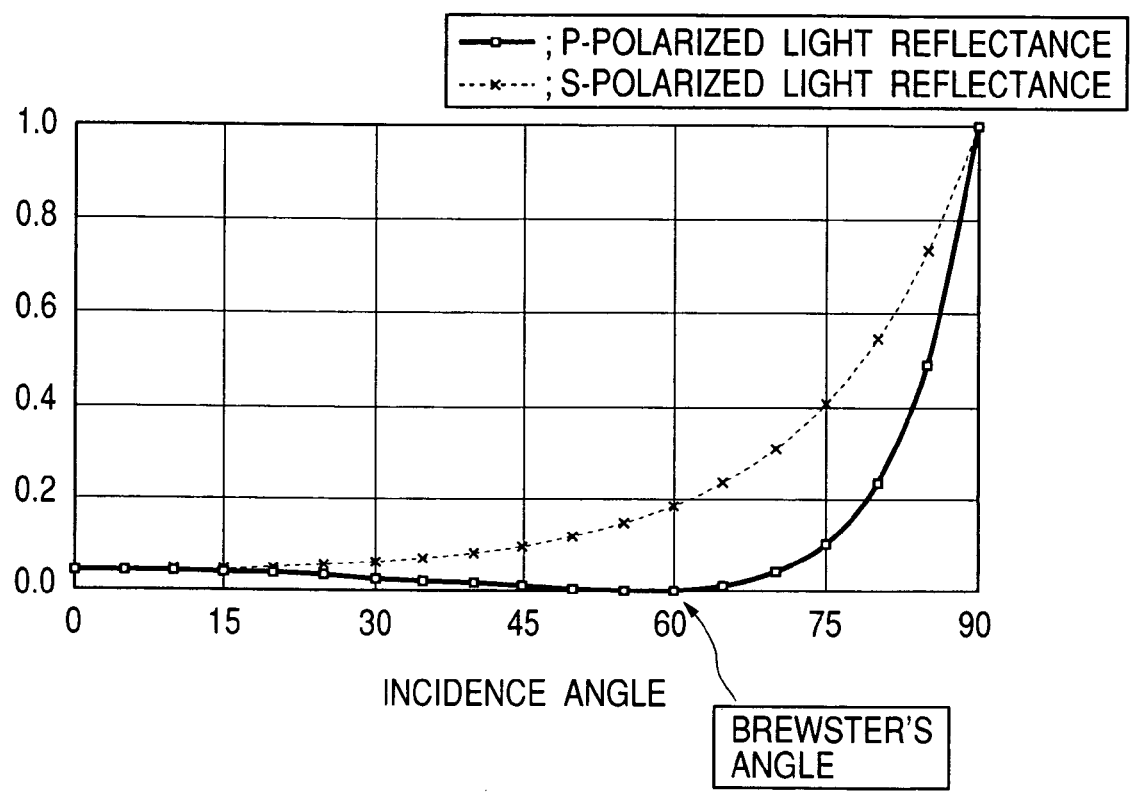
FIG. 12 is an explanatory diagram showing incidence angle dependency of P-polarized light reflectance and transmissivity.

That is, a transmissivity is 99.8% or more with an incidence angle on an optical element (scanning lens) in a range of 0° to 45°. In other words, a Fresnel reflectance is 0.2% at the maximum. It is seen that a reflectance of P-polarized light is improved to 1/20 or less of approximately 4% in a conventional example of FIG. 12, that is, 1% or less that has only a slight influence on an image as flare.

In this embodiment, a grating pitch, a grating depth, and a grating constant are determined according to an incidence angle in a position where light beams reaching a predetermined image height pass through the microstructure grating 8 such that Fresnel reflection generated on each lens surface becomes small. Consequently, flare and ghost light reaching the surface to be scanned 7 are reduced, and it is made possible to provide a scanning optical system that is capable of performing satisfactory image output. In addition, in this embodiment, an illumination distribution in a large area on the surface to be scanned 7 is substantially made uniform.

Further, the object can be substantially accomplished if one or more elements are determined among a grating pitch, a grating depth, and a grating constant.

In addition, in this embodiment, each lens surface of the two scanning lenses of the first and second scanning lenses 6a and 6b is formed in a spherical surface shape or an aspherical surface shape within a main scanning section, and a known special non-spherical surface shape in which a curvature changes from on-axis toward off-axis is adopted as a base shape within a sub-scanning section. However, the lens surface is not limited to this shape and any shape will be adopted as long as, for example, a so-called fθ lens that has a function for focusing deflected light beams in a spot shape on the surface to be scanned 7 to optically scan the surface to be scanned 7 at a uniform speed (fθ characteristic) is used.

In addition, although the light source means 1 is constituted by a single beam laser in this embodiment, the light source means is not limited to this, and for example, a synthesized multi-beam light source in which optical paths of a mono-chip multi-beam laser or a single beam laser, which has a plurality of light emitting portions, are synthesized by beam synthesizing means or the like may be used.

Further, in this embodiment, the semiconductor laser 1 is arranged such that light beams entered into the scanning optical means 6 is entered substantially as P-polarized light. However, the arrangement of the semiconductor laser 1 is not limited to this and, for example, an S-polarized light incidence direction or a polarization direction may be set arbitrarily, and moreover, the shape of the microstructure grating 8 may be optimally formed in line with a polarization direction of light beams entered into the scanning optical means 6.

In this embodiment, the microstructure in which a grating having a rectangular sectional shape is arranged in the one-dimensional direction is described. However, the microstructure is not limited to this, and an arrangement of a microstructure in which a grating having a sectional shape such as triangle, trapezoid, or corrugated shape is arranged in the one-dimensional direction or a microstructure in which a grating having a sectional shape such as a polygonal pyramid like a triangular pyramid, a polygonal prism like a triangular prism, a cone or a column are arranged not only one-dimensionally but also two-dimensionally may be optimized.

As a method of constitution on a lens surface, it is possible to inscribe a shape of a microstructure grating in a mold of injection molding to mold a lens.

In addition, although the scanning optical means 6 is constituted by two lenses in this embodiment, the scanning optical means 6 is not limited to this and may be constituted by, for example, single or three or more lenses.

Embodiment 2

Figure 5:
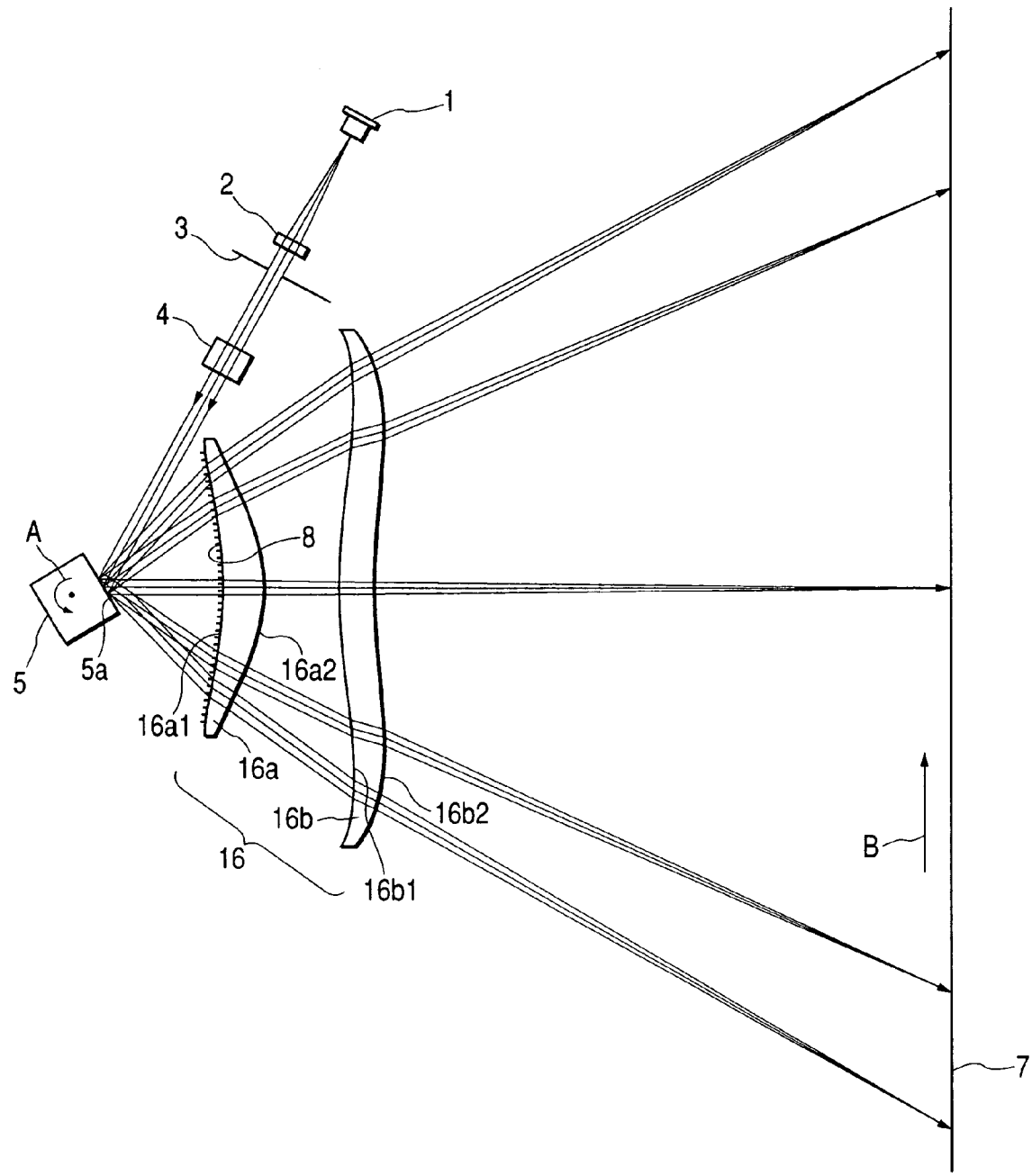
FIG. 5 is a main scanning sectional view of Embodiment 2 of the present invention.

FIG. 5 is a main part sectional view in a main scanning direction (main scanning sectional view) of Embodiment 2 of the present invention. In the figure, the same reference numeral is affixed to elements identical with those shown in FIG. 1.

This embodiment is different from the aforementioned Embodiment 1 in that the microstructure grating 8 is formed only on the surface of the incidence surface 16a1 of the first lens 16a of the scanning optical means 16. Other parts of the structure and an optical action are substantially the same as Embodiment 1, whereby the same effect is obtained.

That is, in the figure, reference numeral 16 denotes a scanning lens system as scanning optical means having a condensing function and an fθ characteristic. The scanning lens system 16 consists of two scanning lenses of the first and second scanning lenses 16a and 16b made of a plastic material, focuses light beams based on image information reflected and deflected by the light deflector 5 on the surface to be scanned 7, and establishes a conjugate relationship between the deflection surface 5a of the light deflector 5 and the surface to be scanned 7 within the sub-scanning section, thereby acquiring a toppling correction function.

Lens surfaces of the two scanning lenses of the first and second scanning lenses 16a and 16b in this embodiment consist of a curved surface shape of a spherical surface or an aspherical surface within the main scanning section shown in FIG. 5. Within the sub-scanning section perpendicular to the main scanning section, a known special non-spherical surface shape in which a curvature changes from on-axis (center of scanning) toward off-axis (periphery of scanning) is adopted as a base shape.

In this embodiment, the microstructure grating 8 is formed only on the surface of the incidence surface 16a1 of the first lens 16a of the scanning optical means 16 as described above.

A shape of the microstructure grating in this embodiment is set as follows assuming that a wavelength to be used λ=780 nm and a refractive index n=1.524.

First, the grating pitch P is set to 0.3 μm due to the same reason as described in the aforementioned Embodiment 1. In addition, the grating depth D is set to 0.16 μm as in Embodiment 1.

Figure 6:
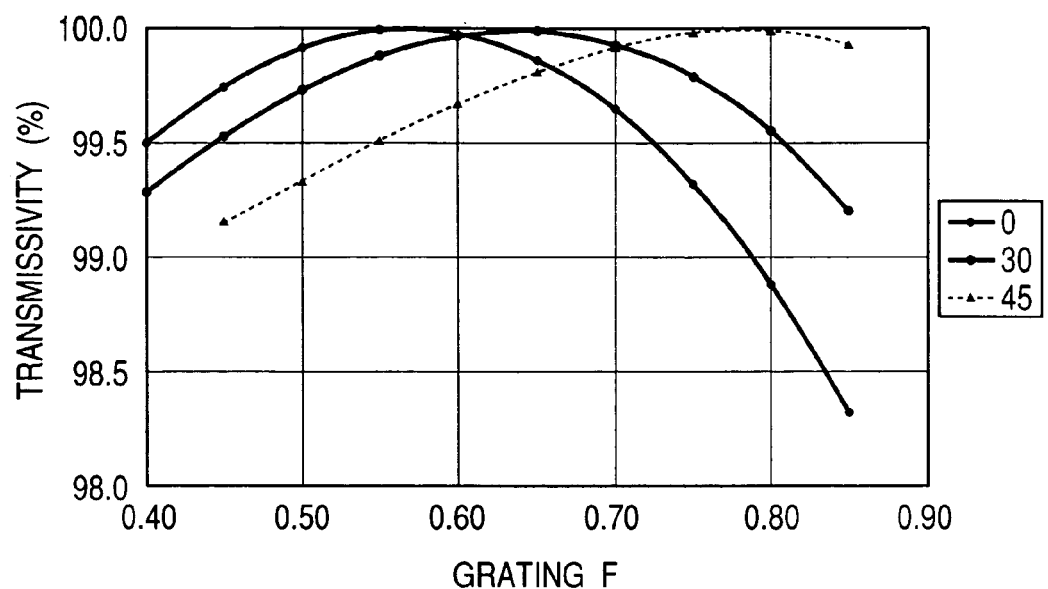
FIG. 6 is an explanatory diagram showing a relationship between a grating and a transmissivity of Embodiment 2 of the present invention.

Next, the grating constant F is set as described below. FIG. 6 shows a result (angular characteristic vs grating F) of investigating a relationship between the grating constant F of the microstructure grating 8 and a transmitted light amount of a 0-th order grating for cases in which the incidence angle θi is 0°, 30°, and 45°. According to the result, if the incidence angle θi is determined, arbitrary transmissivity and reflectance can be obtained by appropriately setting the grating constant F.

On the other hand, in the scanning optical system as in this embodiment, the incidence angle θi of incident light beams on the incidence surface 16a1 of the first lens 16a of the scanning optical means 16 is determined in the position y on the lens surface. It is sufficient to optimize, based on this result, the grating constant F associating it with the incidence angle θi in the position y on the lens surface of the incidence surface 16a1 of the first lens 16a such that Fresnel reflection light on the incidence surface 16a1 of the first lens 16a of the scanning optical means 16 at an arbitrary image height is reduced.

In other words, optimization of a reflectance can be realized by making the grating constant F of on-axis (center of scanning) and off-axis (periphery of scanning) of the microstructure grating 8 different depending on an incidence angle at a position where light beams reaching a predetermined image height pass through the microstructure grating 8.

Figure 7:
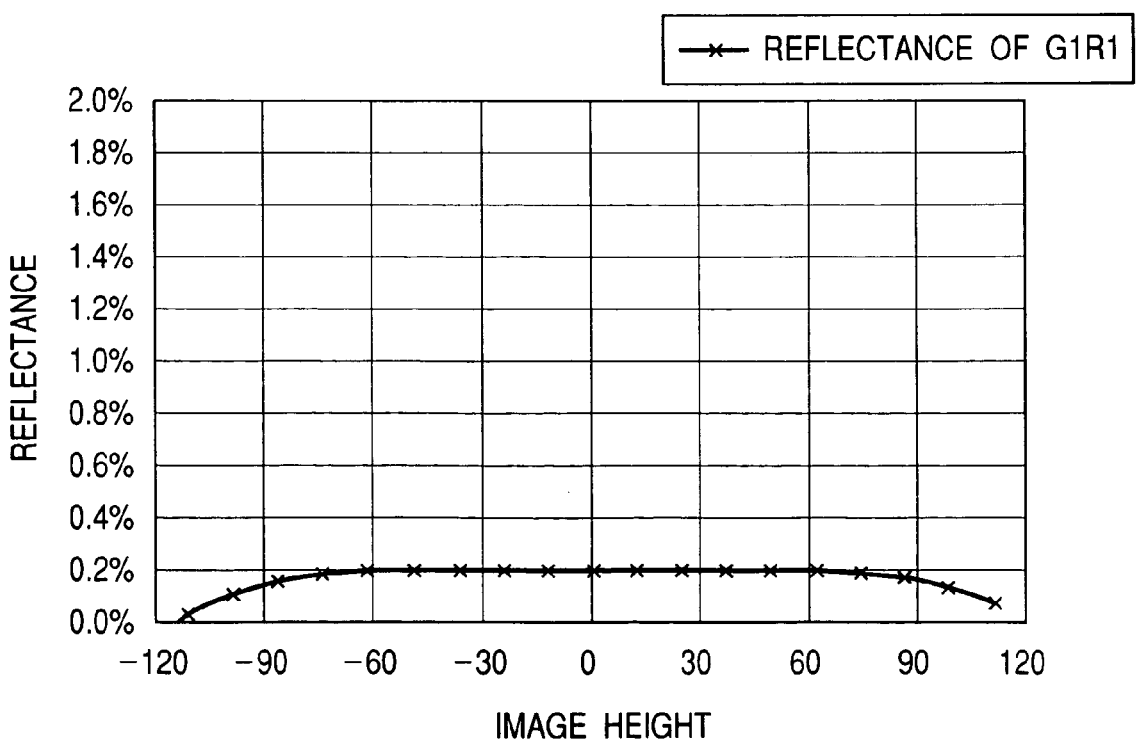
FIG. 7 is an explanatory diagram showing a relationship between an image height and a reflectance of Embodiment 2 of the present invention.

FIG. 7 shows a result of optimizing a reflectance by the procedure described above. In the figure, a (surface) reflectance of the incidence surface 16a1 of the first lens 16a of the scanning optical means 16 is shown.

Consequently, as flare and ghost light on which Fresnel reflection light on the incidence surface 16a1 of the first lens 16a acts, for example, <1> ghost light that reaches the surface to be scanned 7 after the Fresnel reflection light on the incidence surface 16a1 of the first lens 16a returns to the light deflector 5 and is reflected on the deflection surface (reflection surface) 5a of the light deflector 5 to pass through the scanning optical means 6, and <2> ghost light that is multi-reflected between the two surfaces of the incidence surface 16a1 and the exit surface 16a2 of the first lens 16a and reaches the surface to be scanned 7 can be significantly reduced.

Embodiment 3

Figure 8:
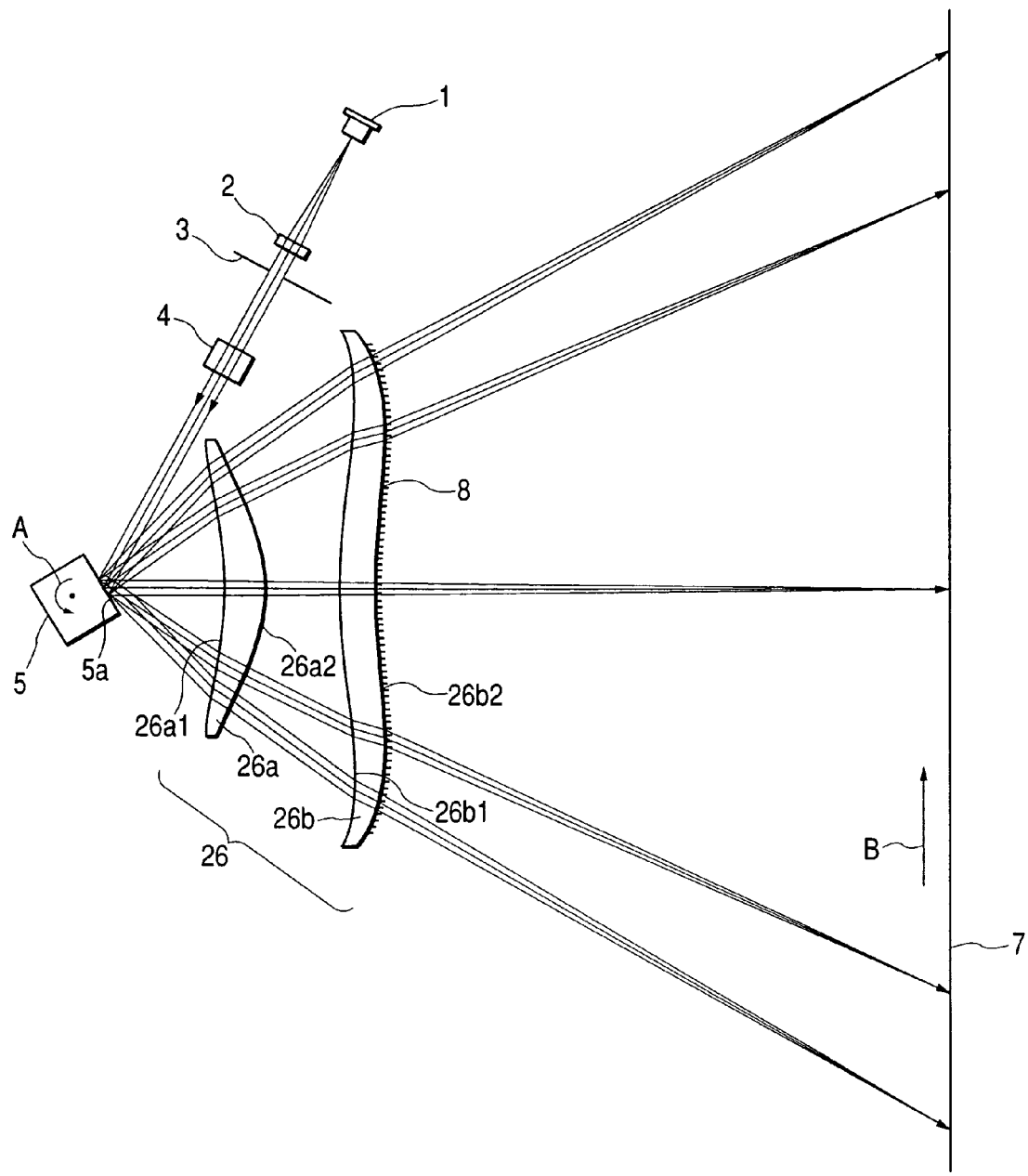
FIG. 8 is a main scanning sectional view of Embodiment 3 of the present invention.

FIG. 8 is a main part sectional view in a main scanning direction (main scanning sectional view) of Embodiment 3 of the present invention. In the figure, the same reference numeral is affixed to elements identical with those shown in FIG. 1.

This embodiment is different from the aforementioned Embodiment 1 in that the microstructure grating 8 is formed only on the surface of the exit surface 26b2 of the second lens 26b of the scanning optical means 26. Other parts of the structure and an optical action are substantially the same as Embodiment 1, whereby the same effect is obtained.

That is, in the figure, reference numeral 26 denotes a scanning lens system as scanning optical means having a condensing function and an fθ characteristic. The scanning lens system 16 consists of the two scanning lenses of the first and second scanning lenses 26a and 26b made of a plastic material, focuses light beams based on image information reflected and deflected by the light deflector 5 on the surface to be scanned 7, and establishes a conjugate relationship between the deflection surface 5a of the light deflector 5 and the surface to be scanned 7 within the sub-scanning section, thereby acquiring a toppling correction function.

Lens surfaces of the two scanning lenses of the first and second scanning lenses 26a and 26b in this embodiment consist of a curved surface shape of a spherical surface or an aspherical surface within the main scanning section shown in FIG. 8. Within the sub-scanning section perpendicular to the main scanning section, a known special non-spherical surface shape in which a curvature changes from on-axis (center of scanning) toward off-axis (periphery of scanning) is adopted as a base shape.

In this embodiment, the microstructure grating 8 is formed only on the surface of the exit surface 26b2 of the second lens 26b of the scanning optical means 26.

A shape of the microstructure grating 8 in this embodiment is set as follows assuming that a wavelength to be used $\lambda=780$ nm and a refractive index n=1.524.

First, the grating pitch P is set to 0.3 µm due to the same reason as described in the aforementioned Embodiment 1. In addition, the grating constant F is set to 0.65 as in Embodiment 1.

Figure 9:
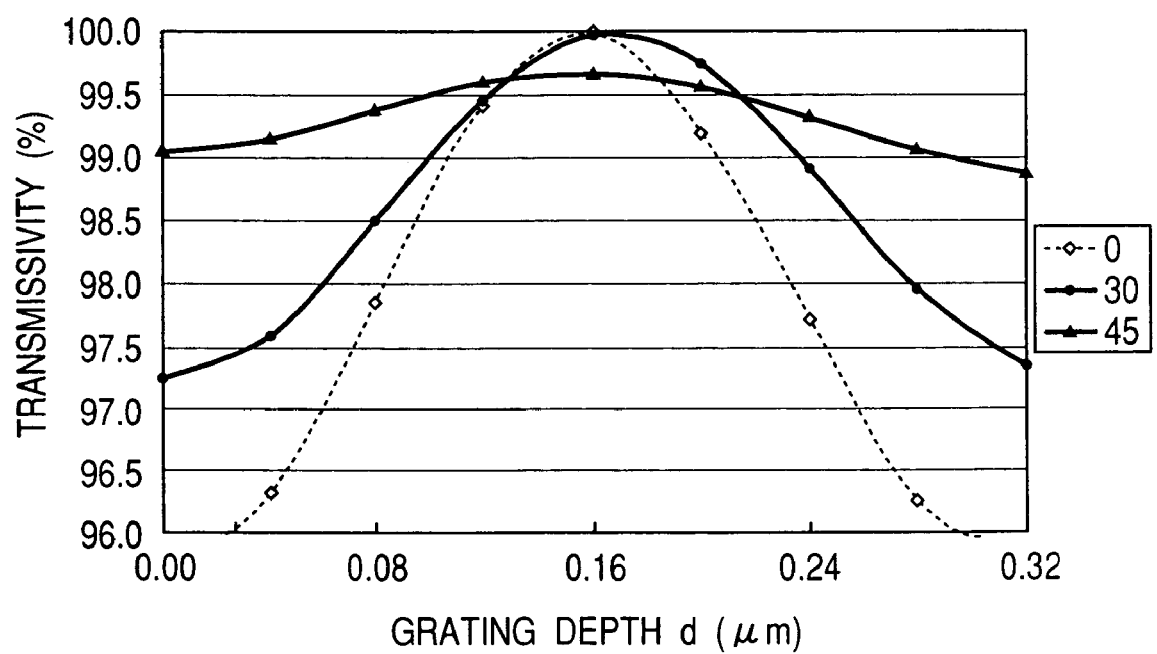
FIG. 9 is an explanatory diagram showing a relationship between a grating depth and a transmissivity of Embodiment 3 of the present invention.

Next, the grating depth D is set as described below. FIG. 9 shows a result (angular characteristic vs grating depth D) of investigating a relationship between the grating depth D of the microstructure grating 8 and a transmitted light amount of a 0-th order grating for cases in which the incidence angle θi is 0°, 30°, and 45°. According to the result, if the incidence angle θi is determined, arbitrary transmissivity can be obtained by appropriately setting the grating depth D.

On the other hand, in the scanning optical system as in this embodiment, the incidence angle θi of incident light beams on the exit surface 26b2 of the second lens 26b of the scanning optical means 26 is determined in the position y on the lens surface. It is sufficient to optimize, based on this result, the grating depth D associating it with the incidence angle θi in the position y on the lens surface of the exit surface 26b2 such that Fresnel reflection light on the exit surface 26b2 of the second lens 26b of the scanning optical means 26 at an arbitrary image height is reduced.

In other words, optimization of transmissivity and a reflectance can be realized by making the grating depth D of on-axis (center of scanning) and off-axis (periphery of scanning) of the microstructure grating 8 different depending on an incidence angle at a position where light beams reaching a predetermined image height pass through the microstructure grating 8.

Consequently, as flare and ghost light on which Fresnel reflection light on the exit surface 26b2 of the second lens 26b acts, for example, <1> flare light that is surface reflection light reflected on the surface to be scanned 7 and reflected on the exit surface 26b2 of the second lens 26b to be returned again to the surface to be scanned 7, and <2> ghost light that is multi-reflected between the two surfaces of the incidence surface 26b1 and the exit surface 26b2 of the second lens 26b and reaches the surface to be scanned 7 can be significantly reduced.

In addition, in the above-mentioned Embodiments 2 and 3, optimization of a transmissivity is realized by making the grating constant F or the grating depth D of on-axis (center of scanning) and off-axis (periphery of scanning) of the microstructure grating 8 different depending on an incidence angle at a position where light beams reaching a predetermined image height pass through the microstructure grating 8. However, the optimization is not limited to this and may be realized by, for example, making all of the grating pitch P, the grating depth D, and the grating constant F different.

In addition, if at least one of a grating pitch, a grating depth, and a grating constant is changed according to an incidence angle at a position where light beams reaching a predetermined image height pass through the microstructure grating 8, the object of the present invention can be substantially attained.

(Image Forming Apparatus)

Figure 10:
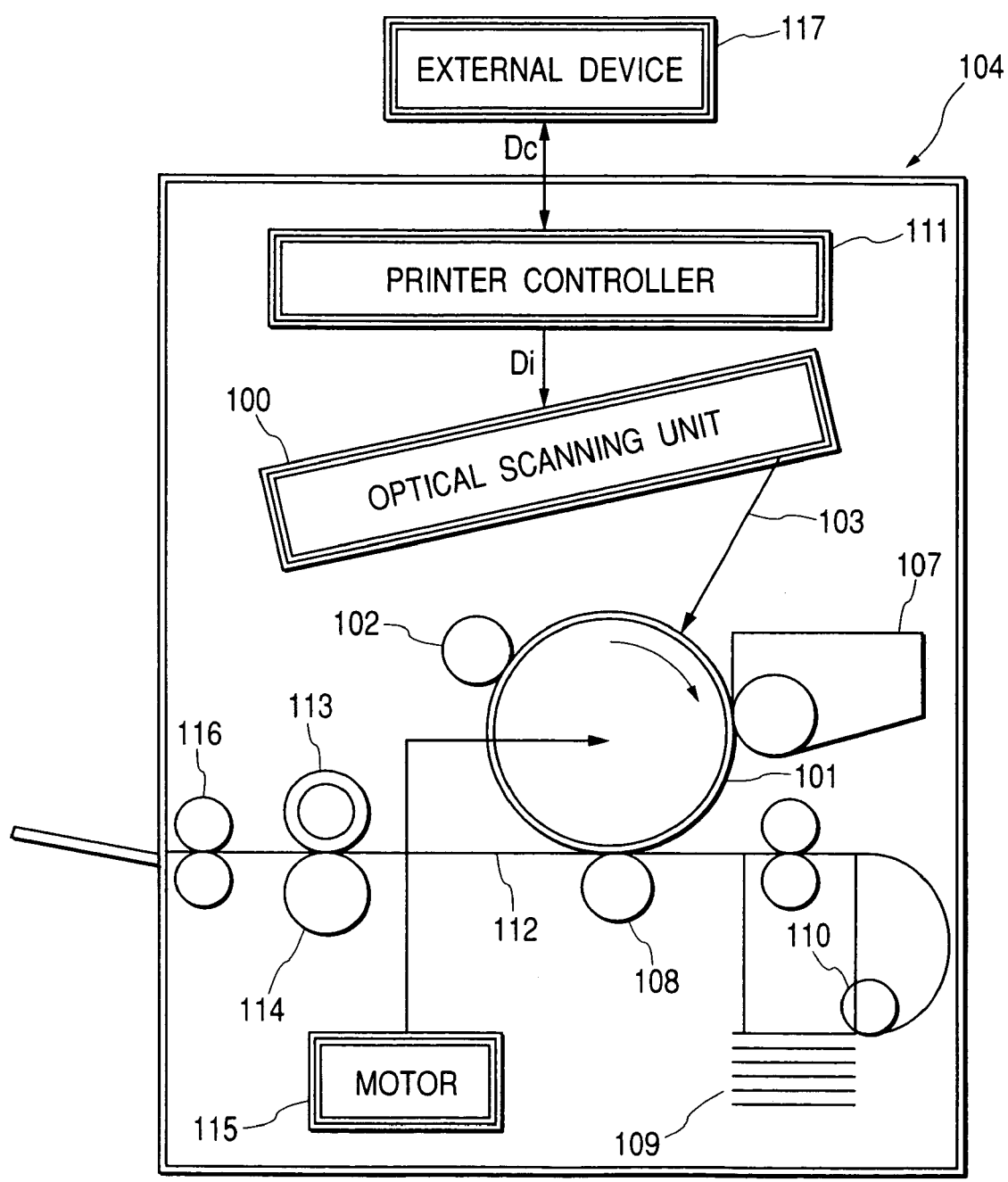
FIG. 10 is a sub-scanning sectional view showing an example of a structure of an image forming apparatus (electrophotographic printer) using a scanning optical system of the present invention.
Figure 11:
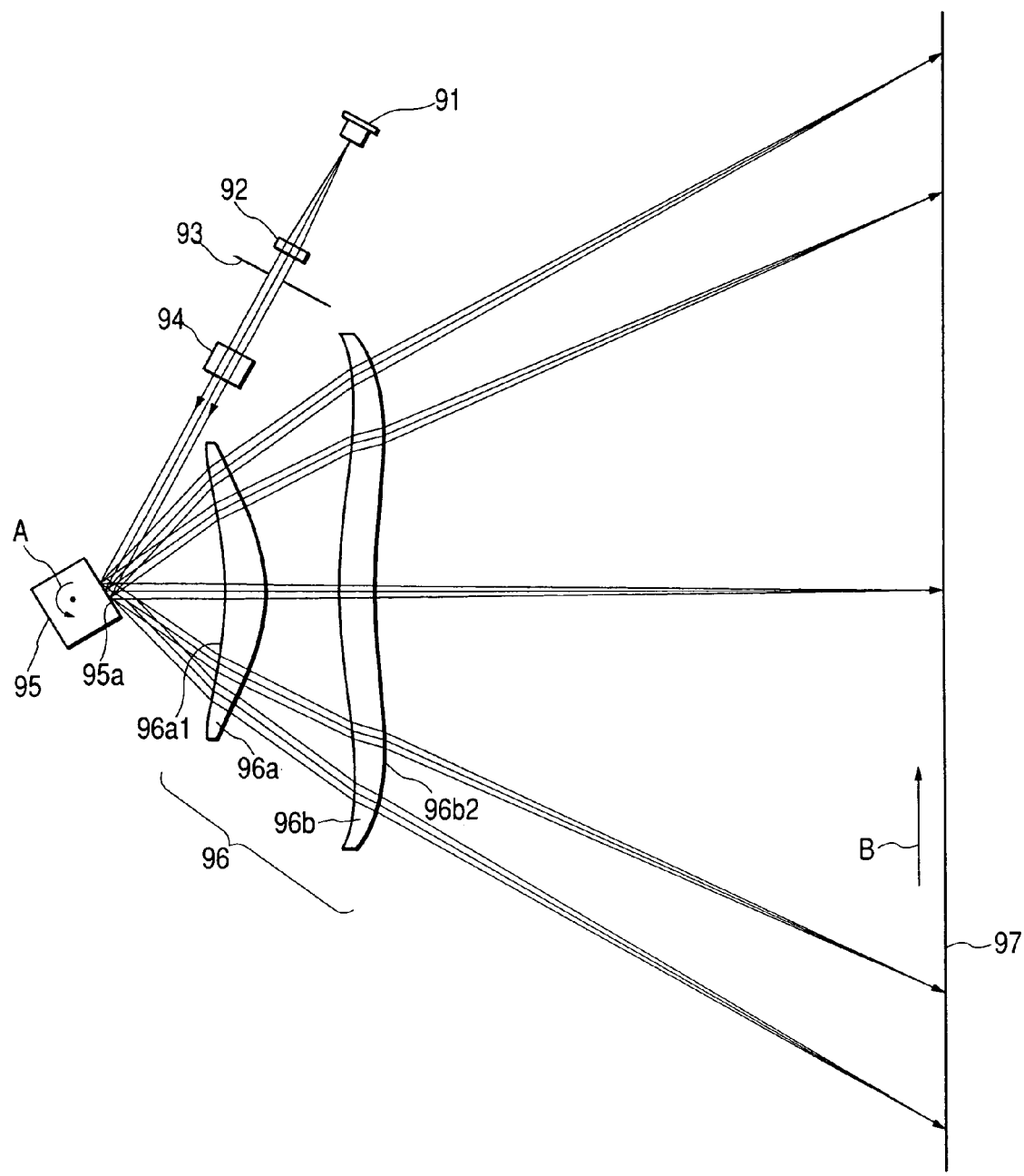
FIG. 11 is a main scanning sectional view of a conventional scanning optical system.

FIG. 10 is a main part sectional view within a sub-scanning section showing am embodiment of an image forming apparatus (electrophotographic printer) using the scanning optical system of the aforementioned Embodiment 1, 2 or 3. In FIG. 10, reference numeral 104 denotes an image forming apparatus. Code data Dc is inputted in this image forming apparatus 104 from an external device 117 such as a personal computer. This code data Dc is converted into image data (dot data) Di by a printer controller 111 in the apparatus. This image data Di is inputted in an optical scanning unit 100 having the structure shown in each of Embodiments 1, 2 and 3. Then, a light beam 103 modulated according to the image data Di is emitted from this optical scanning unit (scanning optical system) 100, and a photosensitive surface of a photosensitive drum 101 is scanned in a main scanning direction by this light beam 103.

The photosensitive drum 101 functioning as an electrostatic latent image bearing member (photosensitive member) is rotated clockwise by a motor 115. Then, in accordance with this rotation, the photosensitive surface of the photosensitive drum 101 moves with respect to the light beam 103 in a sub-scanning direction perpendicular to the main scanning direction. A charging roller 102 for charging the surface of the photosensitive drum 101 uniformly is provided above the photosensitive drum 101 so as to abut the surface of the photosensitive drum 101. In addition, the light beam 103 scanned by the above-mentioned optical scanning unit 100 is irradiated on the surface of the photosensitive drum 101 charged by the charging roller 102.

As described before, since the light beam 103 is modulated based on the image data Di, an electrostatic latent image is formed on the surface of the photosensitive drum 101 by irradiating this light beam 103 thereon. This electrostatic latent image is developed as a toner image by a developing device 107 that is arranged more downstream than an irradiated position of the above-mentioned light beam 103 within a rotational section of the photosensitive drum 101 so as to abut the photosensitive drum 101.

The toner image developed by the developing device 107 is transferred onto a sheet 112 as a material to have an image transferred thereon by a transfer roller (transfer device) 108, which is arranged so as to be opposed to the photosensitive drum 101, below the photosensitive drum 101. Although the sheet 112 is stored in a sheet cassette 109 in front of the photosensitive drum 101 (right side in FIG. 10), it is possible to supply the sheet 112 manually. A sheet feed roller 110 is arranged at an end portion of the sheet cassette 109 and feeds the sheet 112 in the sheet cassette 109 into a conveyance path.

As described above, the sheet 112 that has an unfixed toner image transferred thereon is further conveyed to a fixing device behind the photosensitive drum 101 (left side in FIG. 10). The fixing device is constituted by a fixing roller 113 having a fixing heater (not shown) therein and a pressure roller 114 arranged so as to come into pressurized contact with this fixing roller 113, and heats the sheet 112 conveyed from a transfer portion while pressurizing it in a press-contacting portion of the fixing roller 113 and the pressure roller 114, thereby fixing the unfixed toner image on the sheet 112. Moreover, a sheet discharge roller 116 is arranged behind the fixing roller 113 and discharges the sheet 112 having the image fixed thereon to the outside of the image forming apparatus.

Although not illustrated in FIG. 10, the print controller 111 performs not only the conversion of data described before but also control of each unit in the image forming apparatus such as the motor 115, and a polygon motor and the like in the optical scanning unit 100.

According to the present invention, an optical element, which is provided with a microstructure grating consisting of a structure having an antireflection action corresponding to an incidence angle of light beams, is applied to a scanning optical system as described above, whereby an optical element that can reduce Fresnel (surface) reflection on a lens surface to be a cause of flare and ghost and a scanning optical system having the optical element can be attained.

In addition, according to the present invention, an optical element that can reduce Fresnel reflection on a lens surface without increasing additional steps such as coating as described above and a scanning optical system having the optical element can be attained.

The invention claimed is:

1. A scanning optical system comprising:
light source means for emitting light beams;
deflection means for deflecting the light beams emitted from said light source means; and
imaging optical means for imaging the light beams deflected by said deflecting means onto a surface to be scanned,
wherein said imaging optical means includes a molded lens integrally configured with a substrate having an optical surface on which a microstructure grating is formed, and
wherein at least one of a grating pitch, a grating depth, and a grating constant of the microstructure grating is changed in accordance with an incident angle so as to satisfy the following condition in an entire scanning range:

$$Rmax \leq 1 \ (\%),$$

where Rmax represents a maximum value of a reflectance at each angle of view of the optical surface on which the microstructure grating is formed and the angle of view is defined as an angle formed by a principal ray of the light beam incident on the optical surface on which the microstructure grating is formed and an optical axis of the scanning optical system in a main scanning section.

2. A scanning optical system according to claim 1, wherein at least two of the grating pitch, the grating depth, and the grating constant of the microstructure grating are changed in accordance with the incident angle.

3. A scanning optical system according to claim 1, wherein the microstructure grating is formed on an optical surface in which the incident angle thereon in the main scanning section is maximum among a plurality of the optical surfaces of the scanning optical system.

4. A scanning optical system according to claim 1, wherein the microstructure grating is formed on an optical surface closest to said deflection means among a plurality of optical surfaces of the scanning optical system.

5. A scanning optical system according to claim 1, wherein the microstructure grating is formed on an optical surface closest to the surface to be scanned among a plurality of optical surfaces of the scanning optical system.

6. An image forming apparatus, comprising:
the scanning optical system according to claim 1;
a photosensitive body arranged on said surface to be scanned;
a developing device for developing an electrostatic latent image formed on said photosensitive body as a toner image by the light beams scanned by said scanning optical system;
a transfer device for transferring the developed toner image on a material to have an image transferred thereon; and
a fixing device for fixing the transferred toner image on the material to have an image transferred thereon.

7. An image forming apparatus, comprising:
the scanning optical system according to claim 1; and
a printer controller for converting code data inputted from an external device into an image signal and inputting the image signal into the scanning optical system.

* * * * *